United States Patent
Benisty et al.

(10) Patent No.: US 11,366,749 B2
(45) Date of Patent: Jun. 21, 2022

(54) STORAGE SYSTEM AND METHOD FOR PERFORMING RANDOM READ

(71) Applicant: Western Digital Technologies, Inc., San Jose, CA (US)

(72) Inventors: Shay Benisty, Beer Sheva (IL); Ariel Navon, Revava (IL); Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,461

(22) Filed: Feb. 23, 2021

(65) Prior Publication Data

US 2022/0147440 A1 May 12, 2022

Related U.S. Application Data

(60) Provisional application No. 63/112,016, filed on Nov. 10, 2020.

(51) Int. Cl.
*G06F 12/02* (2006.01)
*G06F 12/0877* (2016.01)

(52) U.S. Cl.
CPC ........ *G06F 12/023* (2013.01); *G06F 12/0877* (2013.01); *G06F 2212/452* (2013.01)

(58) Field of Classification Search
CPC .............. G06F 12/023; G06F 12/0877; G06F 2212/452
See application file for complete search history.

(56) References Cited

U.S. PATENT DOCUMENTS

| | | | | |
|---|---|---|---|---|
| 6,085,193 A * | 7/2000 | Malkin | ............... | G06F 16/9574 |
| 7,716,425 B1 * | 5/2010 | Uysal | .................. | G06F 12/0862 |
| | | | | 711/137 |
| 7,996,642 B1 * | 8/2011 | Smith | ................. | G06F 12/0246 |
| | | | | 711/167 |
| 9,239,794 B1 * | 1/2016 | Merchant | ............ | G06F 12/0868 |
| 9,298,633 B1 * | 3/2016 | Zhao | .................... | G06F 12/0862 |
| 10,642,502 B2 | 5/2020 | Sharon et al. | | |
| 10,649,776 B2 | 5/2020 | Navon et al. | | |
| 10,719,445 B1 | 7/2020 | Navon et al. | | |
| 10,725,781 B1 | 7/2020 | Avraham et al. | | |
| 10,732,848 B2 | 8/2020 | Navon et al. | | |
| 10,846,226 B2 | 11/2020 | Navon et al. | | |
| 2002/0152361 A1* | 10/2002 | Dean | ..................... | G06F 12/123 |
| | | | | 711/160 |
| 2007/0283101 A1* | 12/2007 | El-Essawy | .......... | G06F 12/0862 |
| | | | | 711/137 |
| 2008/0016330 A1* | 1/2008 | El-Essawy | .......... | G06F 12/0862 |
| | | | | 712/225 |
| 2009/0287884 A1* | 11/2009 | Toyoshima | ......... | G06F 12/0862 |
| | | | | 711/137 |
| 2019/0213130 A1* | 7/2019 | Madugula | ........... | G06F 12/1045 |

(Continued)

*Primary Examiner* — Michael Krofcheck
(74) *Attorney, Agent, or Firm* — Crowell & Moring LLP

(57) ABSTRACT

A storage system has a volatile memory, a non-volatile memory, and a controller. The controller of the storage system can implement various mechanisms for improving random read performance. These mechanisms include improved read prediction cache management, using a pattern length for read prediction, and a time-based enhancement for read prediction. Each of these mechanisms can be used alone on in combination with some or all of the other mechanisms.

20 Claims, 18 Drawing Sheets

(56) References Cited

U.S. PATENT DOCUMENTS

| | | | |
|---|---|---|---|
| 2020/0004540 A1* | 1/2020 | Navon | G06F 3/0683 |
| 2020/0285386 A1* | 9/2020 | Nelogal | G06F 3/0653 |
| 2020/0409597 A1 | 12/2020 | Ganesh et al. | |

* cited by examiner

STORAGE SYSTEM AND METHOD FOR PERFORMING RANDOM READ

CROSS-REFERENCE TO RELATED APPLICATION

This application claims the benefit of U.S. provisional patent application No. 63/112,016, filed Nov. 10, 2020, which is hereby incorporated by reference.

BACKGROUND

A random read refers to the situation in which a storage system receives a request to read a non-consecutive sequence of addresses in memory, whereas a sequential read refers to the situation in which the storage system is required to read a large amount of data from consecutive address spaces in memory. To improve the number of input-output operations per second (IOPS) and throughput performance in random read scenarios, a read look ahead (RLA) mechanism can be used to attempt to predict the next read command to be received from a host and pre-fetch that data from the memory.

DETAILED DESCRIPTION

By way of introduction, the below embodiments relate to a storage system and method for improving random read performance. Some of the embodiments discussed below relate to read prediction cache management, using an optimized pattern length for the read prediction, and a time-based enhancement for read prediction. Each of these embodiments can be used alone on in combination with some or all of the other embodiments.

Figure 1A:
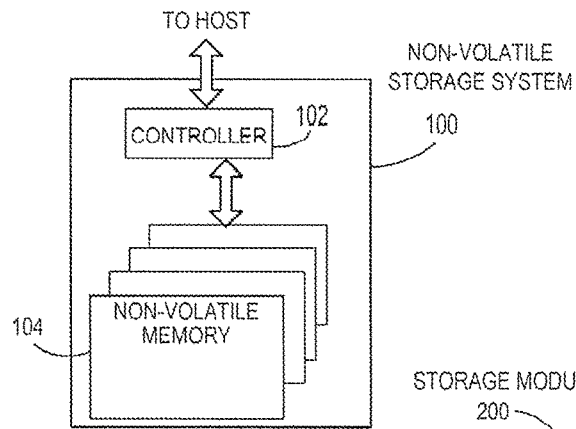
FIG. 1A is a block diagram of a non-volatile storage system of an embodiment.
Figure 1B:
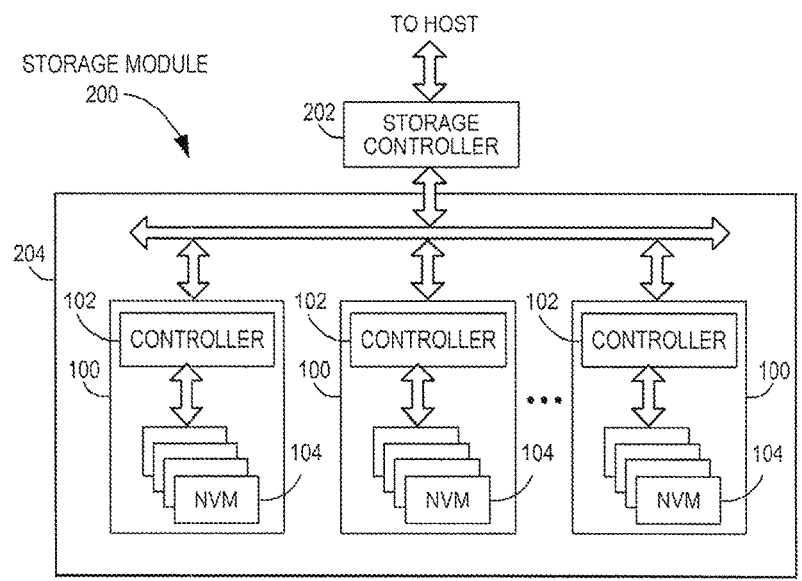
FIG. 1B is a block diagram illustrating a storage module of an embodiment.
Figure 1C:
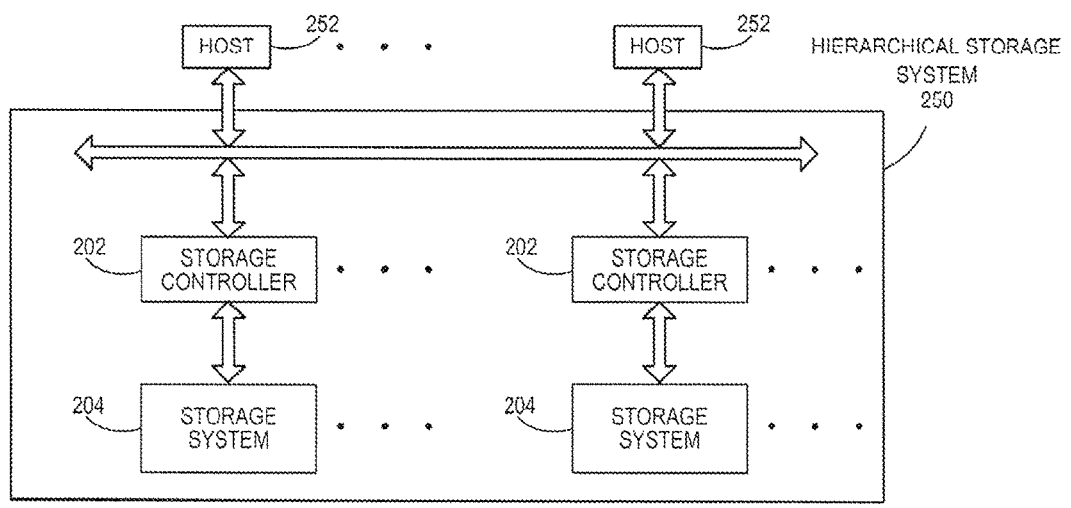
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
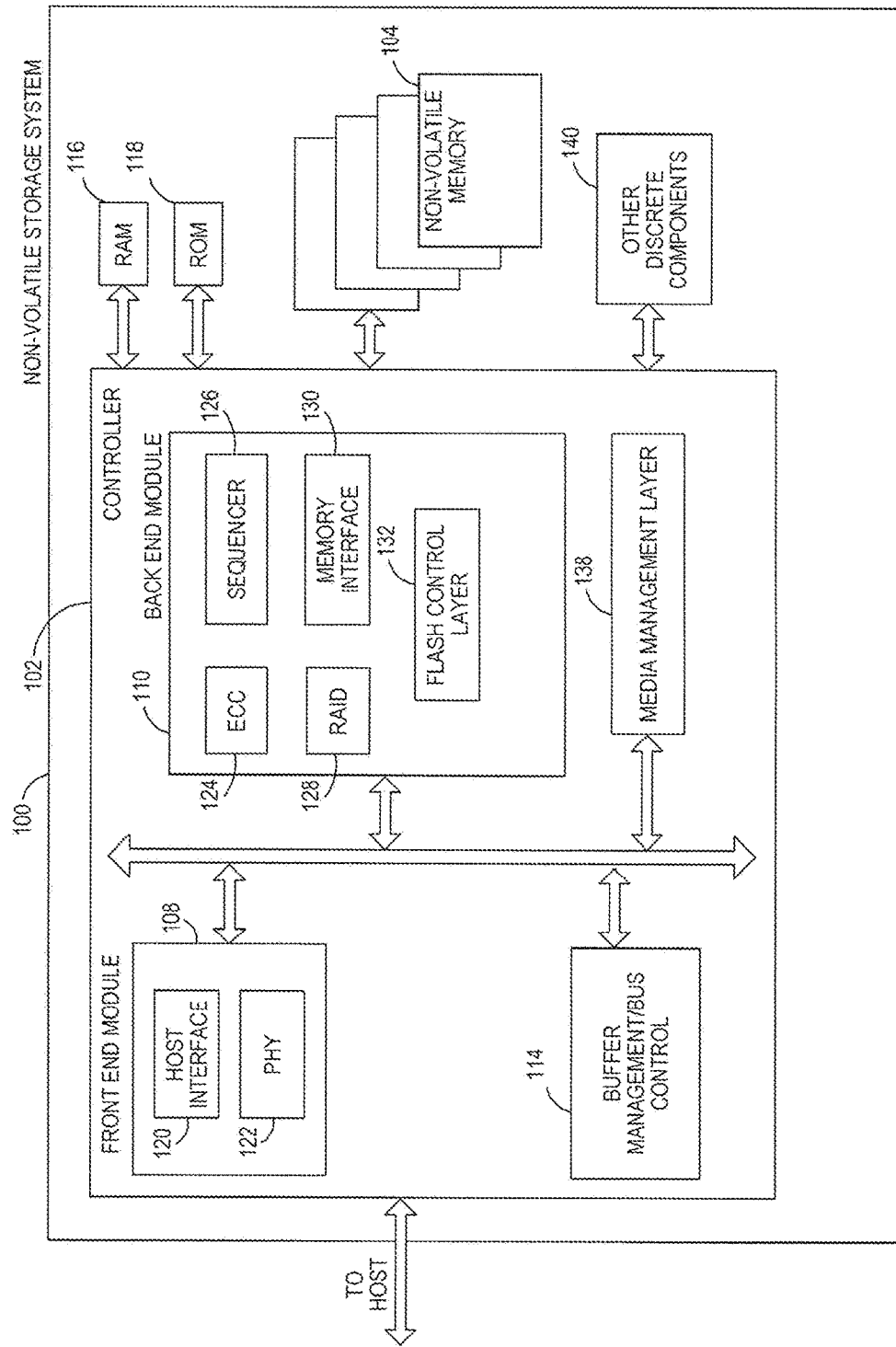
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
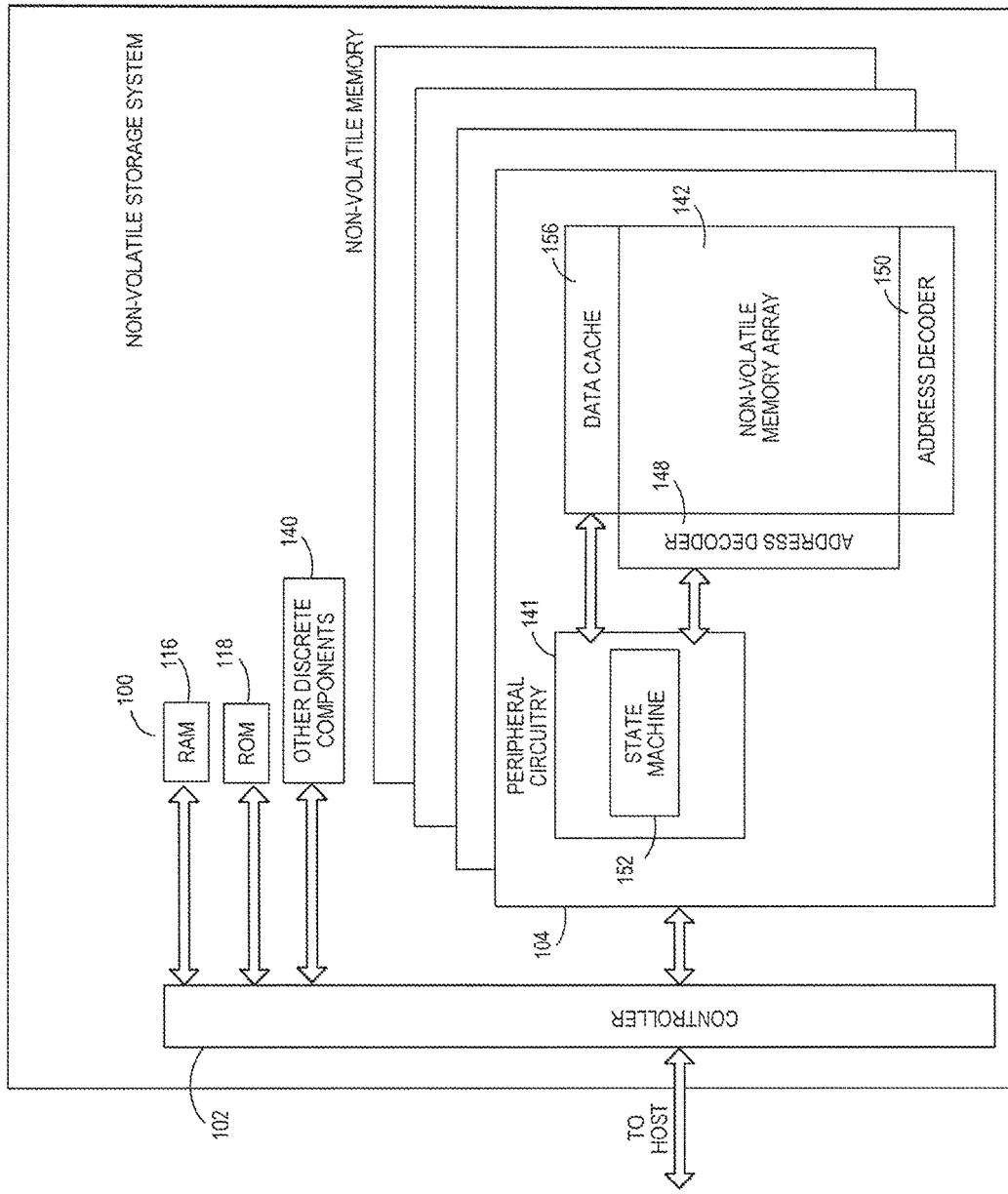
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
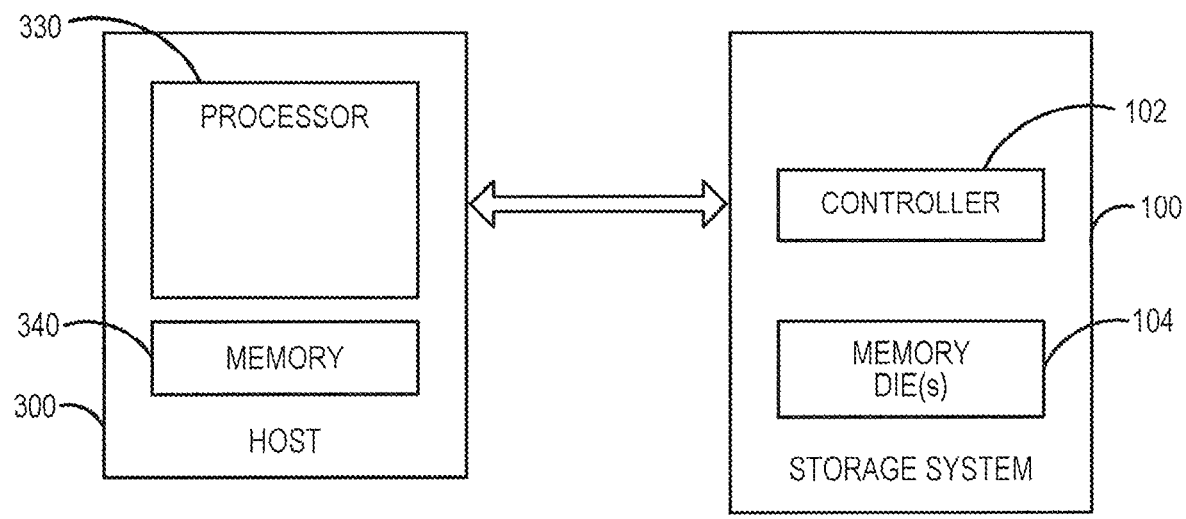
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

Random read performance of the storage system 100 can be a challenging task when working in low-queue-depth environments. A method of predicting future random read commands can be used to increase performance in such environment, as well as in other environments. In general, the controller 102 of the storage system 100 uses a history of prior read commands to predict one or more future read commands. Using the predicted logical block addresses (LBAs) of those predicted commands, the controller 102 can "pre-fetch" the data from the memory 104 for those LBAs and cache the data in volatile memory (e.g., RAM 116). When the next read command is received from the host 300, the controller 102 compares the LBA from the actual read command to the predicted LBA. If the LBAs match, the storage system 100 returns the data cached in the volatile memory 116 to the host 300. This provides improved performance because the host 300 does not need to wait for the storage system 100 to also access the non-volatile memory 104 to retrieve the data. If the LBAs do not match, the cached data is removed from the volatile memory 116, and the controller 102 retrieves the needed data from the non-volatile memory and sends it to the host 300.

Any suitable read prediction method can be used. For example, U.S. Pat. No. 10,732,848, which is hereby incorporated by reference, discloses a history-pattern-matcher (HPM) mechanism for random-read logical block address (LBA) prediction. This mechanism can be used to identify LBA patterns in random read commands and use such patterns to predict the next random read command. The prediction of future random read commands can be used by the controller 102 to do a pre-fetch of the data from the memory 104 for the estimated next commands, either in parallel to other operations or during idle times of the storage system 100.

The practical usage of such capabilities to predict the future next random read commands can require tracking the statistical success hit rate, which is a numerical measure of the fraction of the successful prediction events out of the overall prediction attempts done. The statistical filter that dynamically tracks the current hit can be made compact with a minimal footprint in terms of hardware implementation cost and complexity.

As noted above, in these prior read prediction techniques, if the predicted next read command does not match the immediate next read command (i.e., the LBA in the immediate next read command does not match the LBA in the predicted next read command), the cached data is removed from the volatile memory 116, and the controller 102 retrieves the needed data from the non-volatile memory and sends it to the host 300.

These methods can lead to inferior performance. For example, evicting cached data when the immediate next read command does not match the predicted next read command can degrade the potential gain of a read prediction mechanism (e.g., HPM) by "throwing away" pre-fetched reads of good predictions before having the chance to use them, wasting some of the effort of the storage system 100 (e.g., power and allocated bus capacity required to pre-fetch a predicted command might be wasted when considering only the immediate next command).

To address this, the following embodiments maintain the pre-fetched data in the volatile memory 116 even if the immediate next read command does not match the predicted next read command. The following paragraphs provide example implementations of this embodiment. It should be noted that these are merely examples and that other implementation can be used. It should also be noted that these embodiments can be used with any suitable read prediction technique and should not be limited to the specific read prediction techniques discussed in these examples (e.g., HPM).

In one embodiment, a cache layer is placed on top of a read-prediction block (such as an HPM block) that will allow usage of the pre-fetched read command at a later time. This approach is in contrast to the approaches described above, which allows only immediate usage of the pre-fetched command and, therefore, throws away fetched commands that do not fit the exact single next command. By implementing this embodiment, the controller 102 can implement a management method of the prediction-cache layer according to prediction performance ("hit-rate") measures. Using the management method of the prediction cache buffer, the controller 102 can evacuate, out of all the commands currently placed in the volatile memory 116, the command with the minimal prediction score. In this way, the volatile memory 116 can contains the most-probable predicted future random read command for later use.

Figure 4:
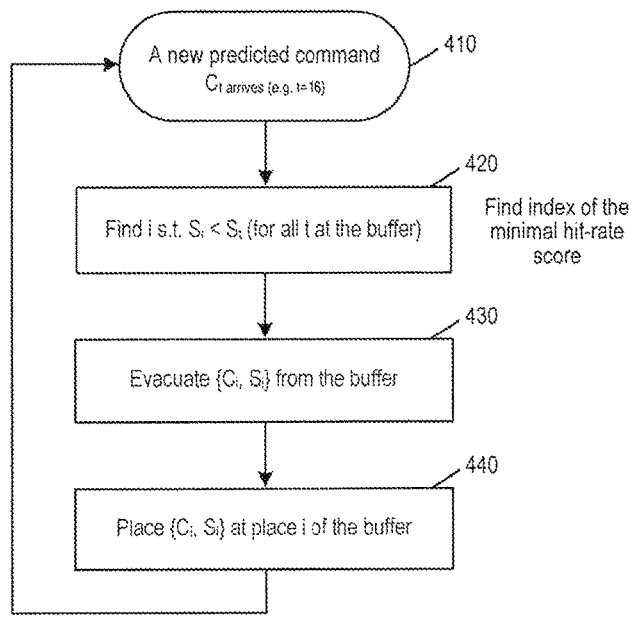
FIG. 4 is a diagram and flow chart of a method of an embodiment for using a hit-rate based cache mechanism for a prediction cache buffer.

Turning again to the drawings, FIG. 4 is a diagram and flow chart of a method of an embodiment for using a hit-rate based cache mechanism for a prediction cache buffer. As shown in FIG. 4, the volatile memory (read prediction cache buffer) 116 stores, at each point in time (e.g., t=16 in this example), hit-rate scores (St) associated with each of the L predicted commands (Ct). The hit-rate score is an indication of likelihood of a successful match with a next read command actually received from the host 300. In this example, each predicted command includes both the start LBA and the length (in bytes) of the predicted command. As shown in the flow chart in FIG. 4, when a new predicted command is generated (act 410), the controller 102 finds the index of the minimal hit-rate score (act 420), evacuates it from the buffer 116 (act 430), and places it at place i in the buffer 116 (act 440).

Figure 5:
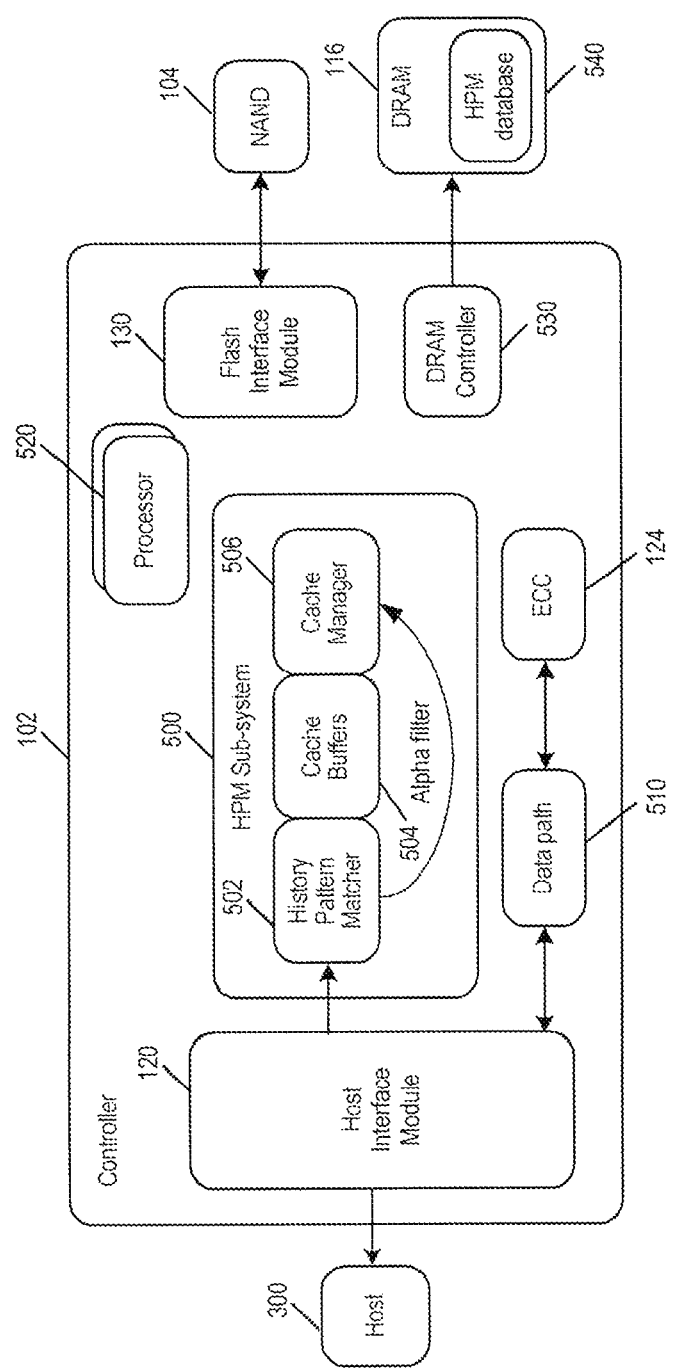
FIG. 5 is a block diagram showing one implementation of a storage system controller of an embodiment.

FIG. 5 is a block diagram of a particular implementation of the controller 102 in this embodiment. As shown in FIG. 5, the controller 102 in this embodiment contains several of the elements discussed above. These components include a host interface module 120 for interfacing with the host 300, a flash interface module 130 for interfacing with the non-volatile memory 104, a DRAM controller 530 for interfacing with DRAM 116 (which contains an HPM database 540), processors 550, a data path 510, and an ECC module 124. The controller 102 in this embodiment also comprises a history pattern matcher (HPM) sub-system 500 that includes a history pattern matcher 502, cache buffers 504, and a cache manager 506). While the cache buffer 504 is shown as volatile memory inside the controller 102, as noted above, the cache can be in volatile memory outside of the controller 102). The "alpha filter" refers to a compact, statistical filter that provides statistical filtering to dynamically track the current hit rate. In operation, the cache manager 506 receives instructions/hints from the HPM 502 and, using this knowledge, provides better cache management using the allocation and eviction method discussed above.

In another embodiment, the cache evacuation metric can be a combined measure of the stored hit-rate and the "age" of the predicted command, such that the command that was predicted a long time ago will be less likely to be relevant for the current point of time prediction (compared to a later prediction command, which is closer in time to the present point-of-time).

Figure 6:
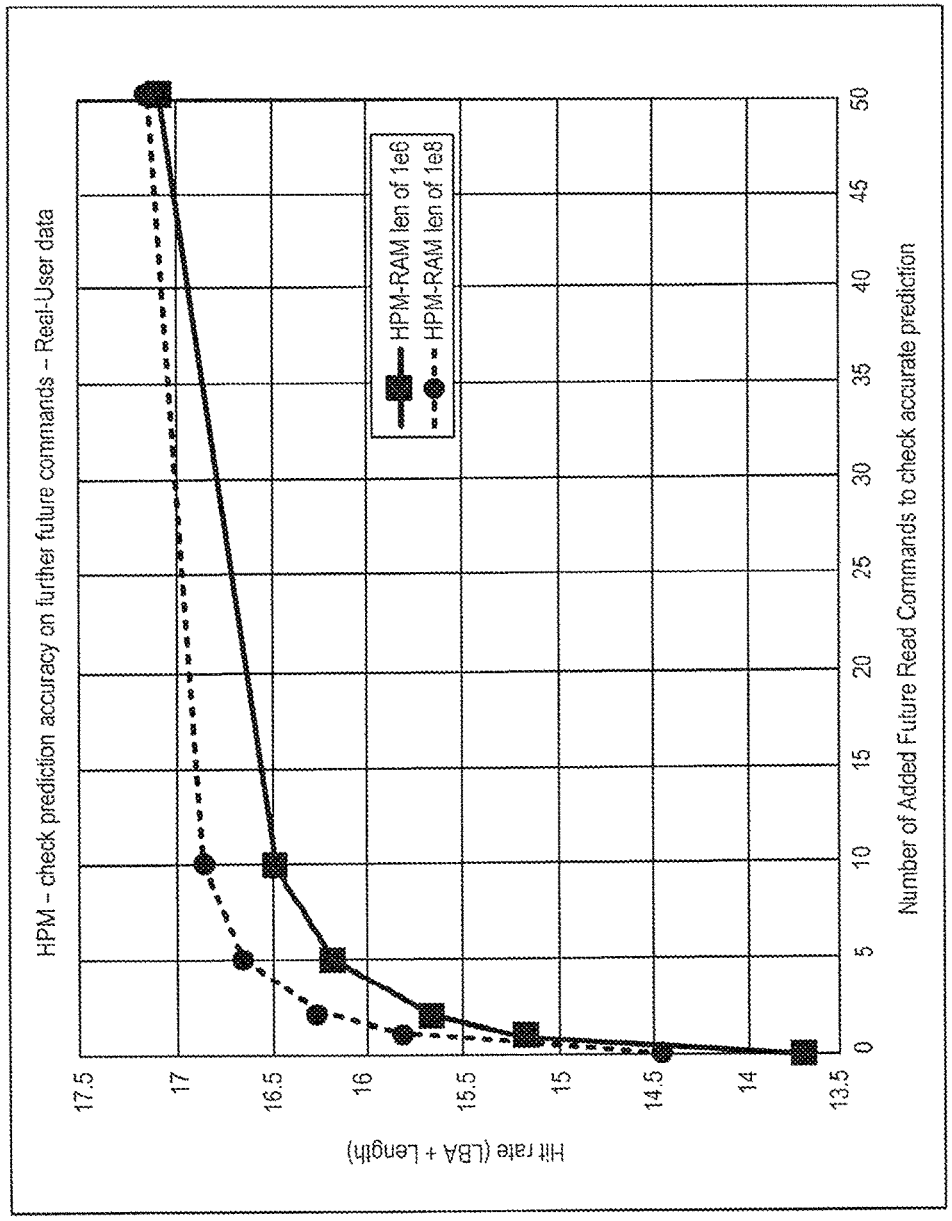
FIG. 6 is a graph of hit-rates as a function of a prediction cache length of an embodiment.
Figure 7:
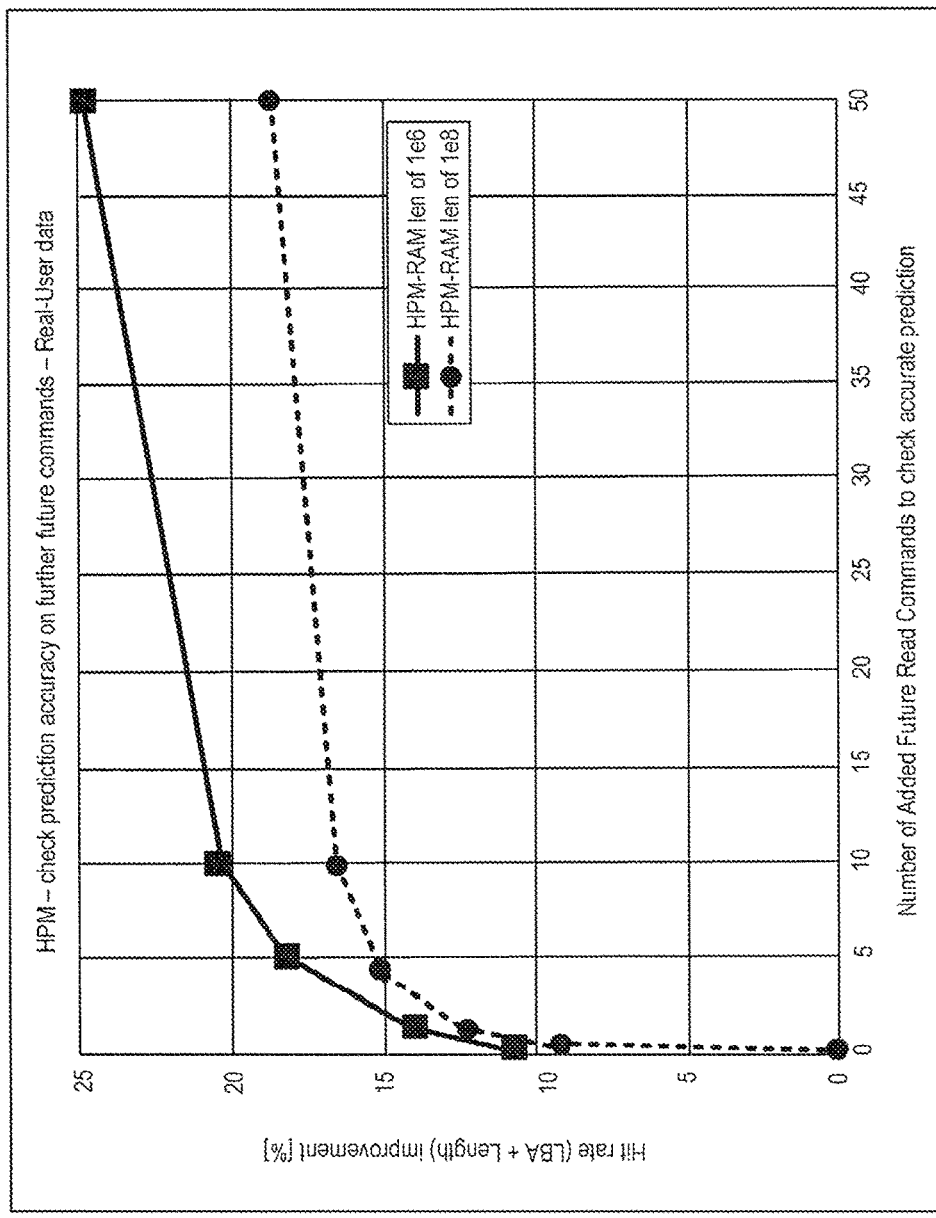
FIG. 7 is a graph showing hit-rate improvement as a function of a prediction cache length of an embodiment.

FIGS. 6 and 7 are graphs of example simulation results. FIG. 6 is a graph of hit rate as a function of a prediction cache length of an embodiment. As shown in FIG. 6, the hit rate (Y-axis, expressed in percent of the total number of random read commands) is shown as a function of the allocated prediction-cache buffer size (X-axis) (i.e., how many commands can be placed in the buffer). The calculation of the hit-rate is based on checking if a predicted command appears in any of the coming X commands received in the future from the host 300. The left X value (0) reflects the reference method (no allocation of prediction-cache buffer).

FIG. 7 is a graph showing hit-rate improvement as a function of a prediction cache length of an embodiment. This graph presents the same data as FIG. 6, just in different normalization of the Y-axis values, such that it is now the relative improvement (in percentage from the reference hit-rate performance of the current approach (no prediction cache usage)). As this graph shows, a potential prediction rate improvement of up to 25% can be achieved using these embodiments. In addition to improving the prediction hit-rate, these embodiments can reduce redundant system resources and overhead (including power and bus traffic allocation), which can increase random read performance results especially in low queue-depth environments (e.g., a queue depth of one).

In another embodiment, which can be used alone or in combination with other embodiments presented herein, the controller 102 implements an optimized pattern length for prediction of random read commands. As noted above, a random read scenario refers to the situation in which the storage system 100 receives a request to read a non-consecutive sequence of addresses, whereas a sequential read scenario refer to the situation in which the storage system 100 is required to read large data portions in a consecutive address space. For sequential reads, mechanisms, such as read look ahead (RLA), are available that try to pre-fetch the next read command and improve the number of input-output operations per second (IOPS) and throughput performance. In contrast, with random reads, each read command has to be processed and executed one after the other, with no parallelism. That said, the history pattern matcher mechanism discussed above can be used to identify logical block address (LBA) patterns in random read scenarios to attempt to predict the next read commands.

This approach is intended to allow pre-fetch of the next read commands before being issued by the host 300 and, by that, improve the system TOPS and throughput performance, both in benchmarks and in real user applications. However, several common random-read benchmarks, as well as real user data logs of such random read sequences, are not pure synthetic random and actually include a large portion of repeating patterns of such "random" sequences.

Another approach is to use a hit-rate-score-based selective prediction of future random read commands that maintain a prediction-hit-rate score per each command in the meta-data of the prediction module. This enables a selective updating of the content of a limited-space history log and conditionally updating it, such that the most-frequent patterns can be kept in the history log, even in case of overlapping pointing of a different pattern. A practical real-time implementation of the HPM predictive read concept is allowed by using hash functions that direct each history pattern to a certain address in a history log that contains the previously-seen following command.

Figure 8A:
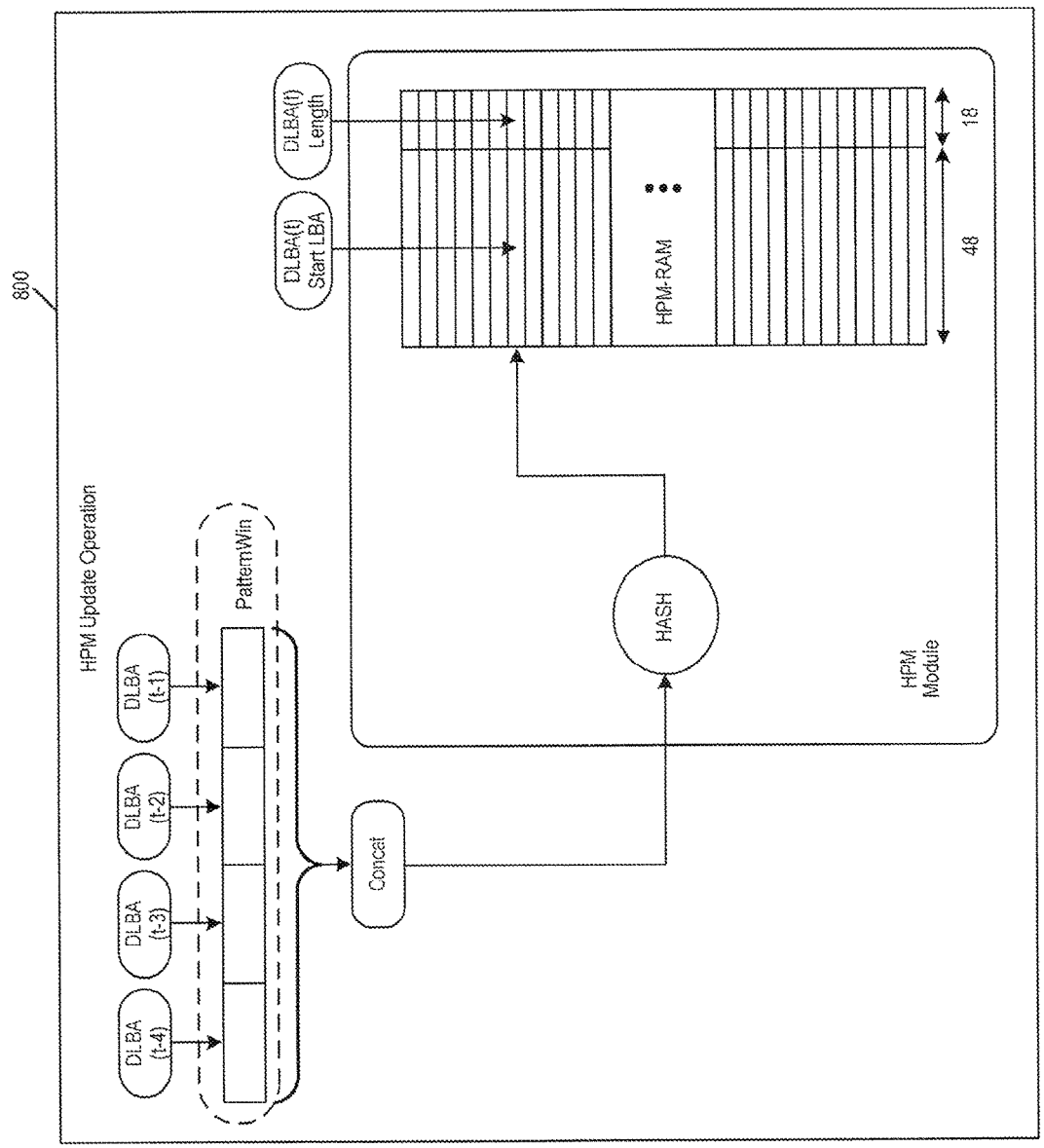
FIG. 8A is a block diagram of a history pattern matcher (HPM) update operation of an embodiment.
Figure 8B:
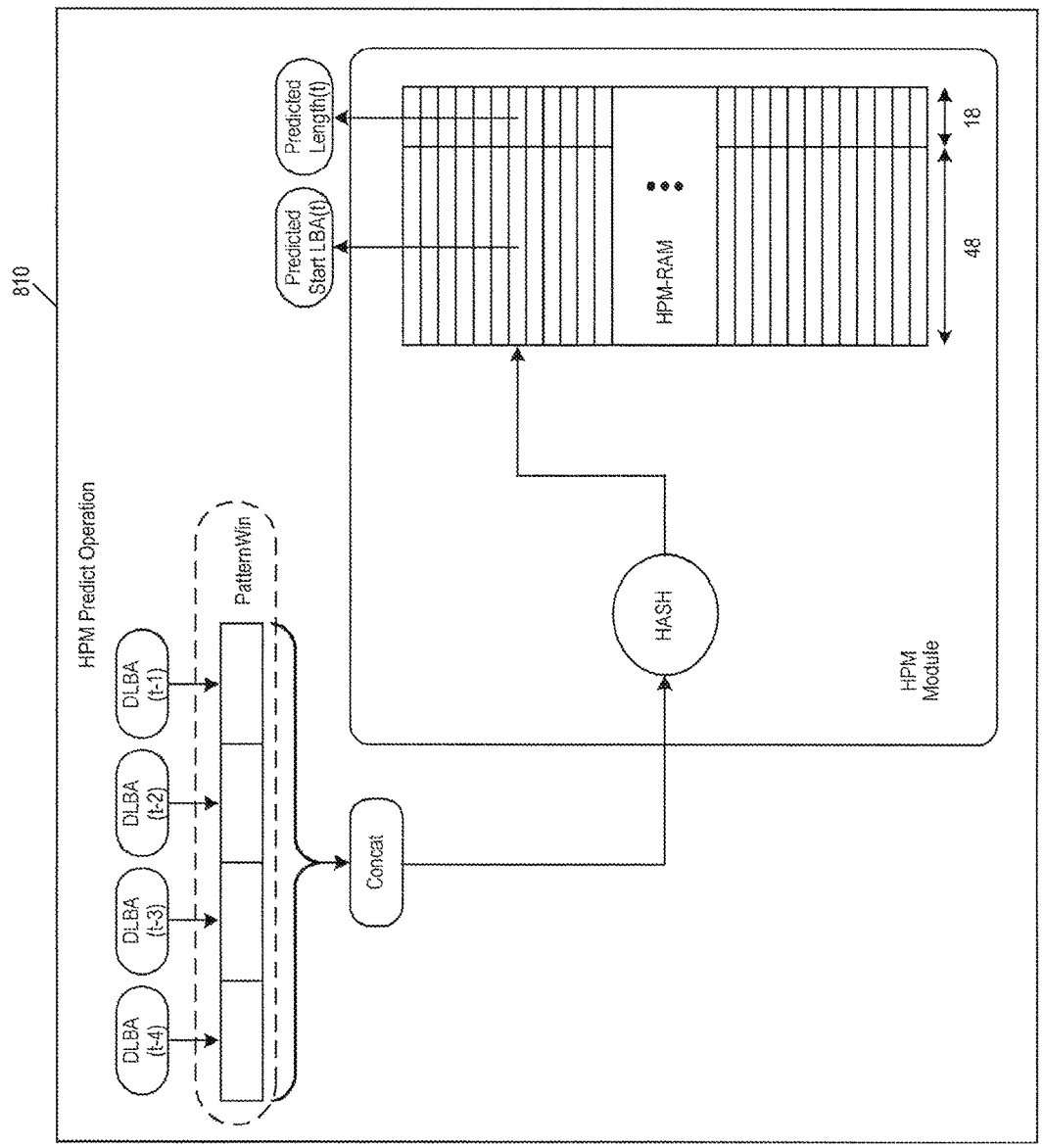
FIG. 8B is a block diagram of a history pattern matcher (HPM) predict operation of an embodiment.

All of these approaches to provide a prediction mechanism for future random read commands are based on a concatenation of the previous X commands, where X is a fixed integer value (e.g., 4). This buffer of the previous X commands is noted as PatternWin in FIGS. 8A and 8B, where FIG. 8A is a block diagram of a history pattern matcher (HPM) update operation of an embodiment, and FIG. 8B is a block diagram of a history pattern matcher (HPM) predict operation of an embodiment.

The following embodiments recognize that a different or flexible PatternWin length might suit different use cases. More specifically, these embodiments present a dynamic method for predicting future random read commands based on previous patterns. The number of previous commands that are used to identify the specific pattern occurrences in the past traffic is noted as PatternWin. In one embodiment, an optimized PatternWin is utilized and is chosen from several options based on best prediction performance ("Hit-Rate") criteria.

In general, the controller 102 of the storage system 100 holds several HPM-mechanisms based on different PatternWin values and, for each one, holds a measure of the prediction Hit-Rate. At each point of time, the controller 102 can chose the predicted value based on all proposals of the different PatternWin length HPM systems. More specifically, the predicted LBA that has the highest (average) Hit-Rate score can be chosen as the best candidate for a pre-fetch. The number of votes for each LBA value can also be included in the decision on the LBA to fetch.

In one embodiment, this method can be implemented in the controller 102 as a cost-effective, unified hardware block that will utilize common hardware elements (sequentially, one after the other), as the typical response duration is not challenging. It should be noted that this is merely one implementation and that other implementations can be used.

Figure 9:
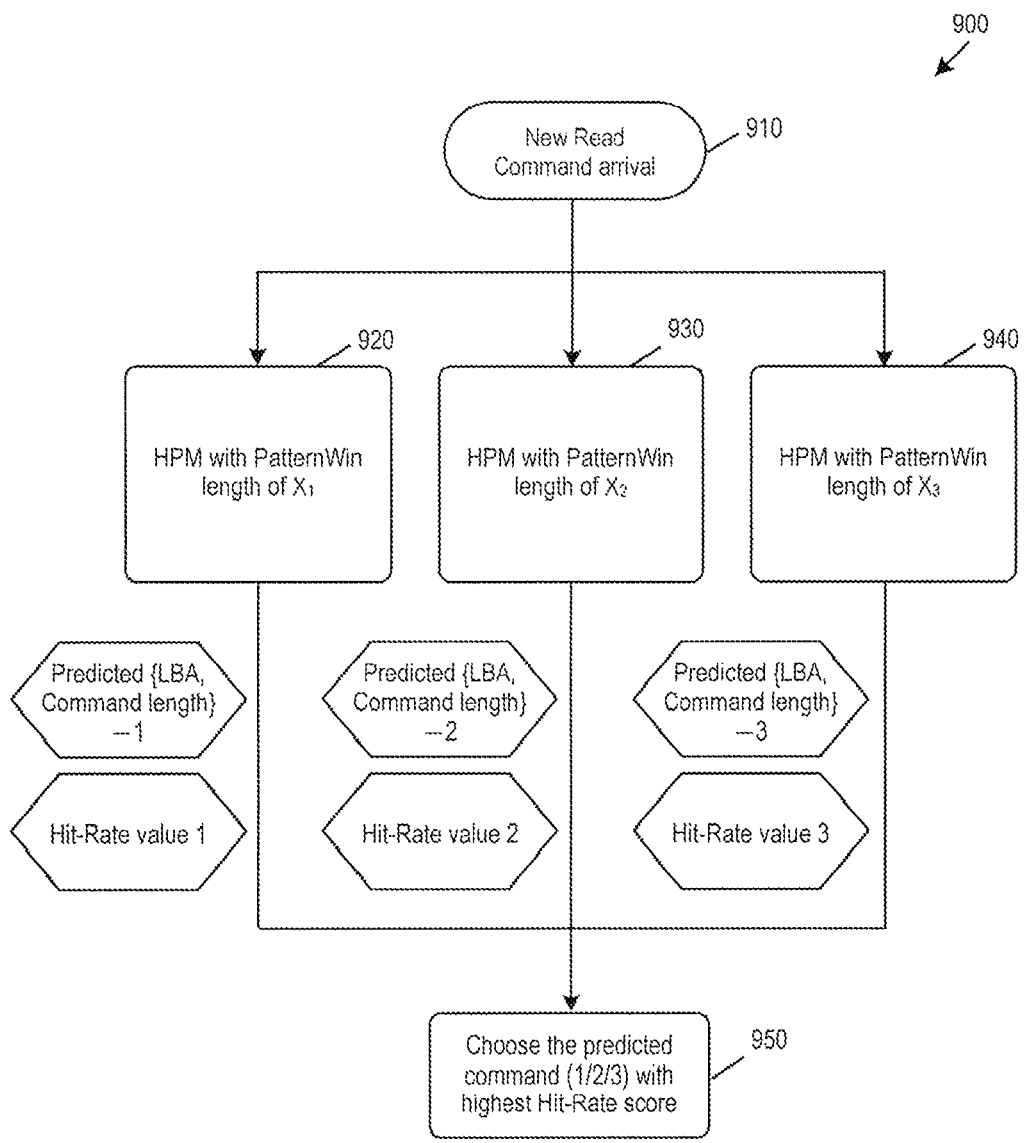
FIG. 9 is a flow chart of a method of an embodiment for predicting future random read commands based on different pattern lengths.

Turning again to the drawings, FIG. 9 is a flow chart 900 of a method of an embodiment for predicting future random read commands based on different pattern lengths. As shown in FIG. 9, after a new read command arrives (act 910), the command is processed in parallel by three HPM mechanism (acts 920, 930, 940), each with a different PatternWin length (X1, X2, and X3, respectively). This results in three different predictions with three different hit rate values. The controller 102 then chooses the predicted command with the highest hit-rate score (act 950).

Figure 10:
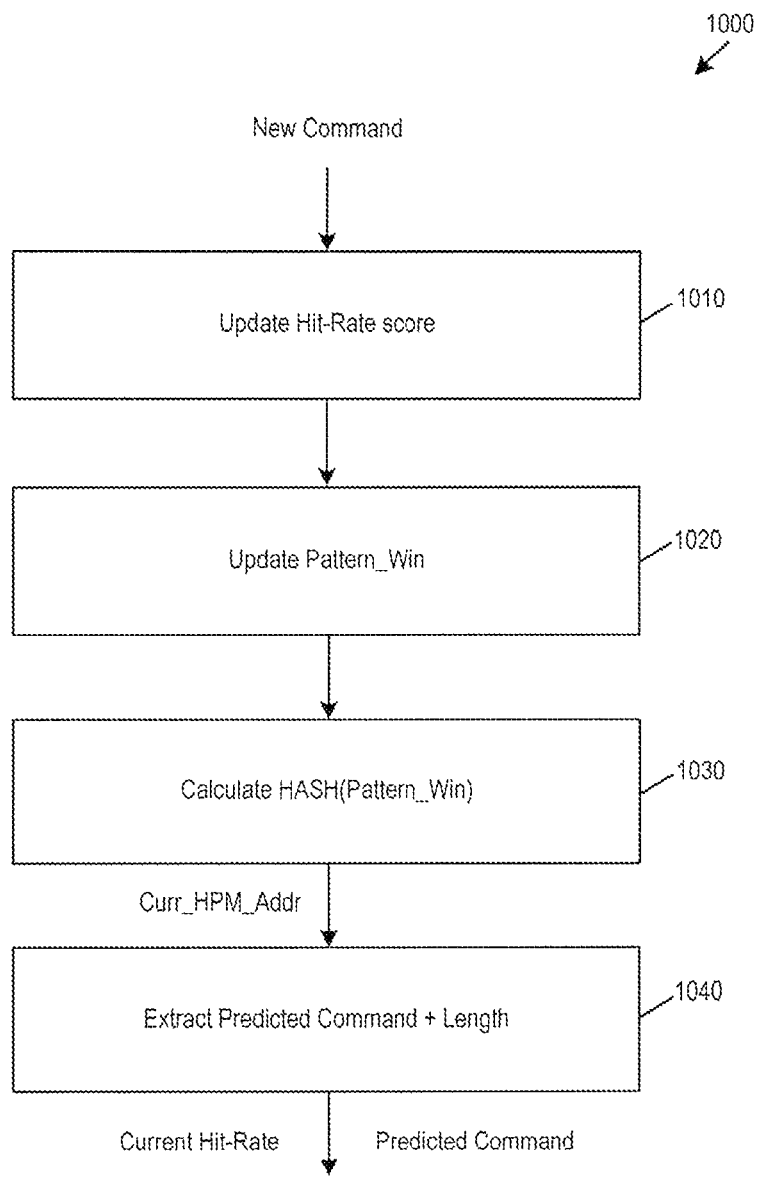
FIG. 10 is a flow chart of a method of an embodiment performed by an HPM block.

FIG. 10 is a flow chart 1000 of a method of an embodiment performed by an HPM block. As shown in FIG. 10, when a new command arrives, the controller 102 updates the hit-rate score (act 1010) and updates the Pattern win (act 1020). Then, the controller 102 calculates the hash (act 1030) and extracts the predicted command and length (act 1040). This results in a current hit rate and predicted command.

Figure 11A:
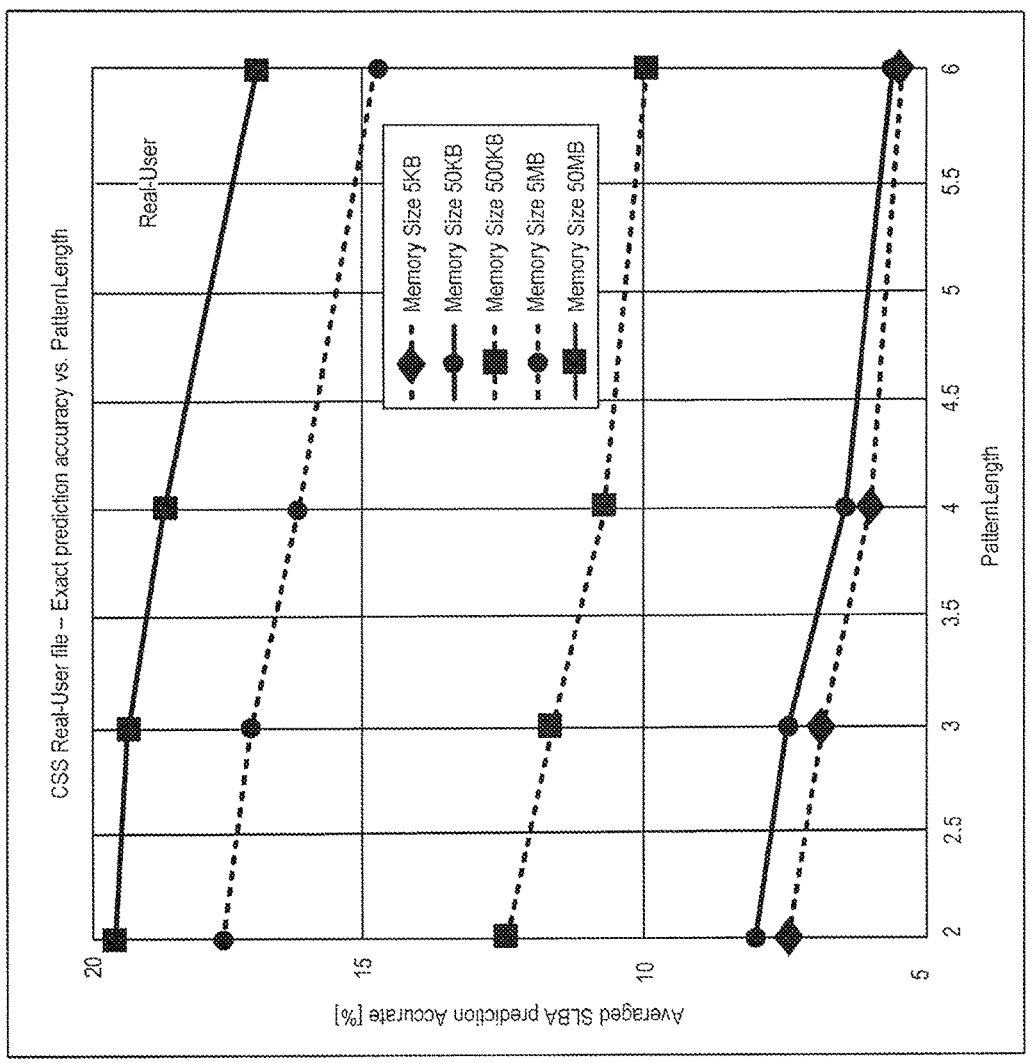
FIG. 11A is a graph of simulated results of a prediction hit rate of an embodiment based on real user data.
Figure 11B:
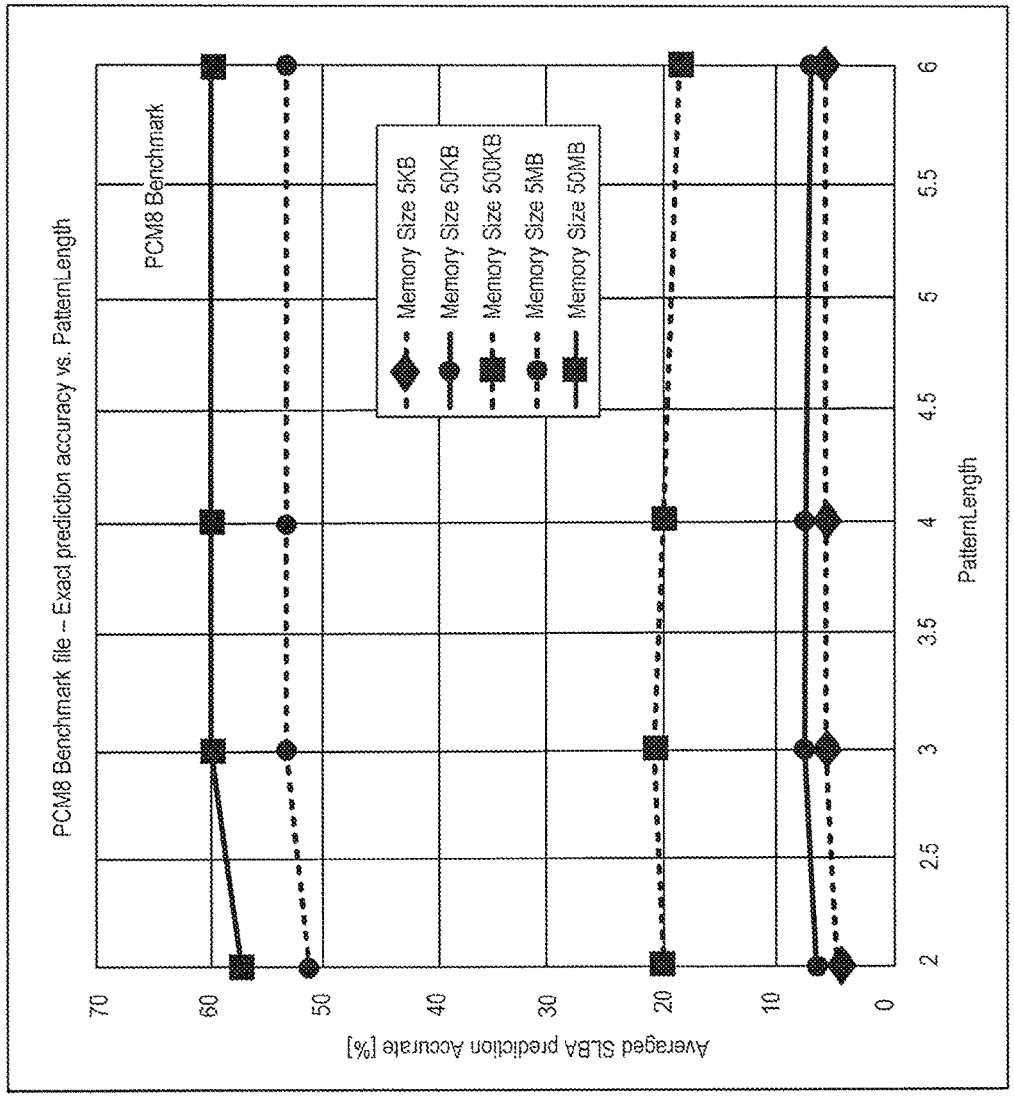
FIG. 11B is a graph of simulated results of a prediction hit rate of an embodiment based on an analysis of benchmark traces.

FIGS. 11A and 11B are graphs of results that simulate the accurate prediction capabilities of a HPM-like mechanism. FIG. 11A is a graph of simulated results of a prediction hit rate of an embodiment based on real user data, and FIG. 11B is a graph of simulated results of a prediction hit rate of an embodiment based on an analysis of benchmark traces. The X-axis for both graphs is the PatternWin length. It can be observed that for certain use-cases, such as the real-user trace, a shorter PatternWin length (e.g., 2) will provide better prediction results, whereas for other use cases, such as the benchmark, shorter PatternWin lengths are inferior. These results demonstrate the need for a dynamic PatternWin length that will adjust according to the specific current traffic conditions to provide improved random read performance with superior flexibility and adaptable capabilities to different use-cases In one embodiment, multiple HPM engines are instantiated, where each engine works on a different PatternWin length. The selected prediction result that triggers the pre-fetch operation is based on the average results of the multiple HPMs. For instance, when having five HPM engines, while the first engine predicts LBA Y with a probability of 80% and the other engines predicts LBA X with a probability of 70%, the selected LBA is X. In other embodiments, both the hit rates and average results are considered.

In another embodiment, the multiple HPM engines are just used for the first calibration or online training. After some time, the controller 102 can the HPM engine with the PatternWin length that is more optimized for the current workload and continue working only with it. The online training may be activated only in some special scenarios, such as reset, power cycle, and periodical time.

In another embodiment, which can be used alone or in combination with other embodiments presented herein, time-based enhancements for predictive read are provided. More specifically, the approaches to provide predictions for future random read commands noted above are based on predicting the logical block address (LBA) and the length of the next command(s) but do not relate to the timing of the expected next random read command. Therefore, the controller 102 (or the host 300) will not know the expected duration until the next command occurs. This lack of timing information in prediction mechanisms of future random read commands can lead to inferior system performance.

Figure 12A:
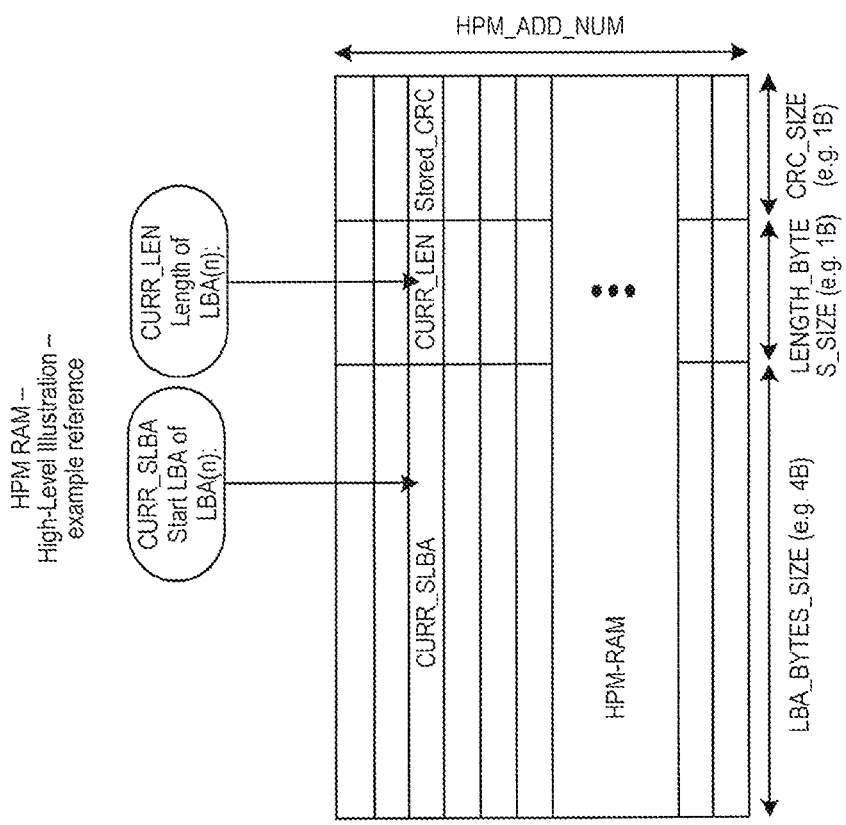
FIGS. 12A and 12B are illustrations of placing data in a history pattern matcher (HPM) random access memory (RAM) of an embodiment.
Figure 12B:
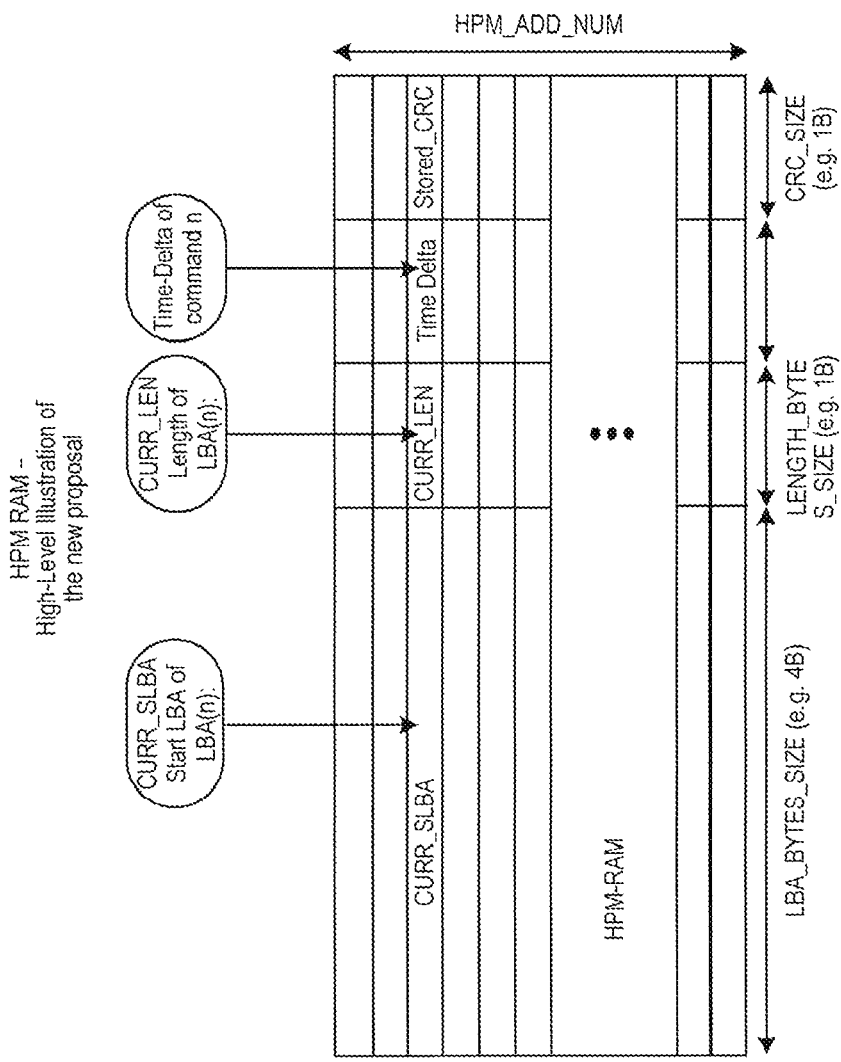

To address this problem, the following embodiments add the prediction of the expected arrival time of the next random read command. This arrival time prediction can be coupled to the prediction of the LBA and the length of the next random read command. In one embodiment, this can be implemented using the history pattern matcher (HPM) mechanisms discussed above, in which a hash-based mechanism is used to predict future random read commands. In this example implementation, during the update of the HPM-RAM, the time elapsed from the arrival of previous command until the arrival of the current command is added to the data stored at each entry of the HPM-RAM logger. This is illustrated in FIGS. 12A and 12B, where FIG. 12A shows a prior way of placing data in the HPM-RAM, and FIG. 12B shows how that can be supplemented with arrival time information (time delta).

Figure 13:
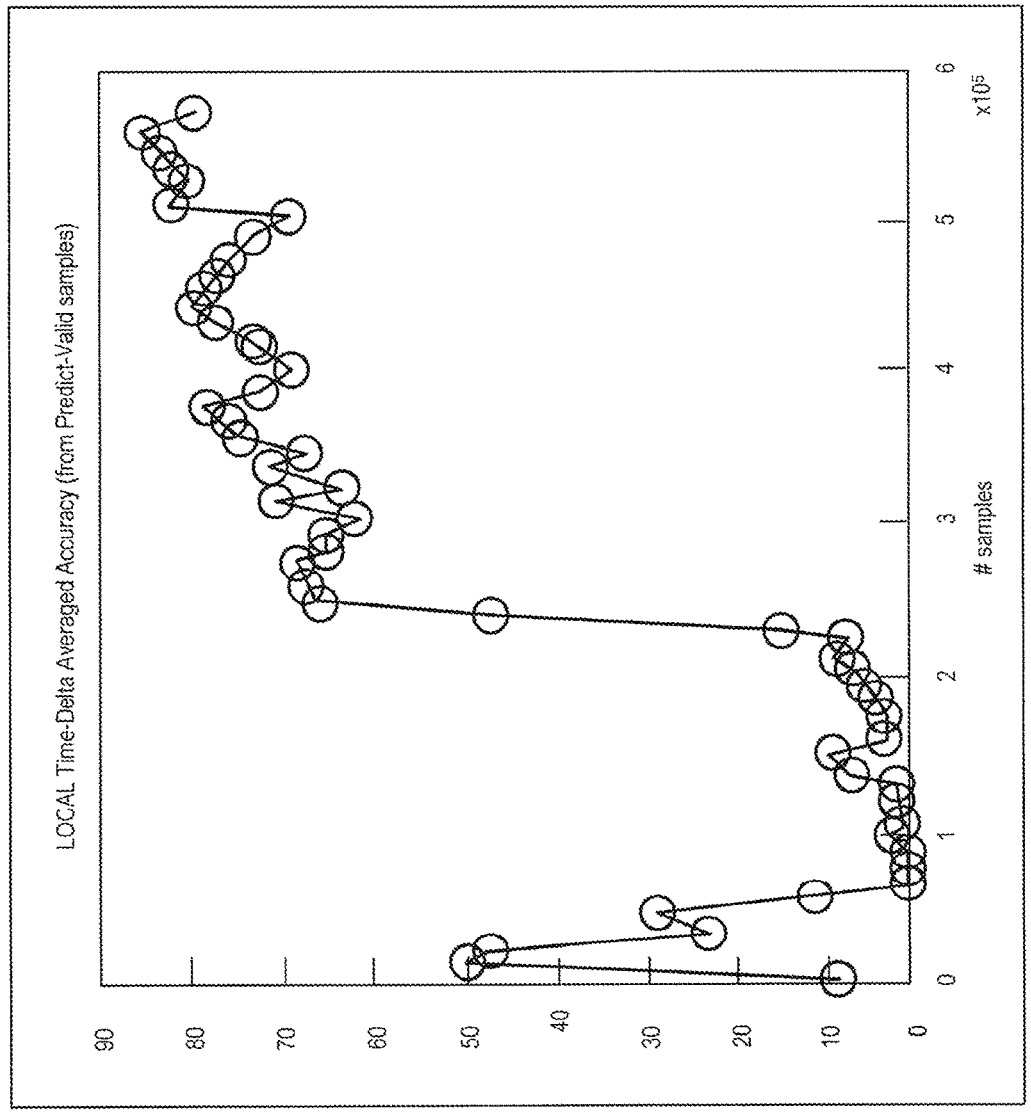
FIG. 13 is a graph of a simulation of an embodiment of prediction rates of an expected arrival time of a next random read command.
Figure 14:
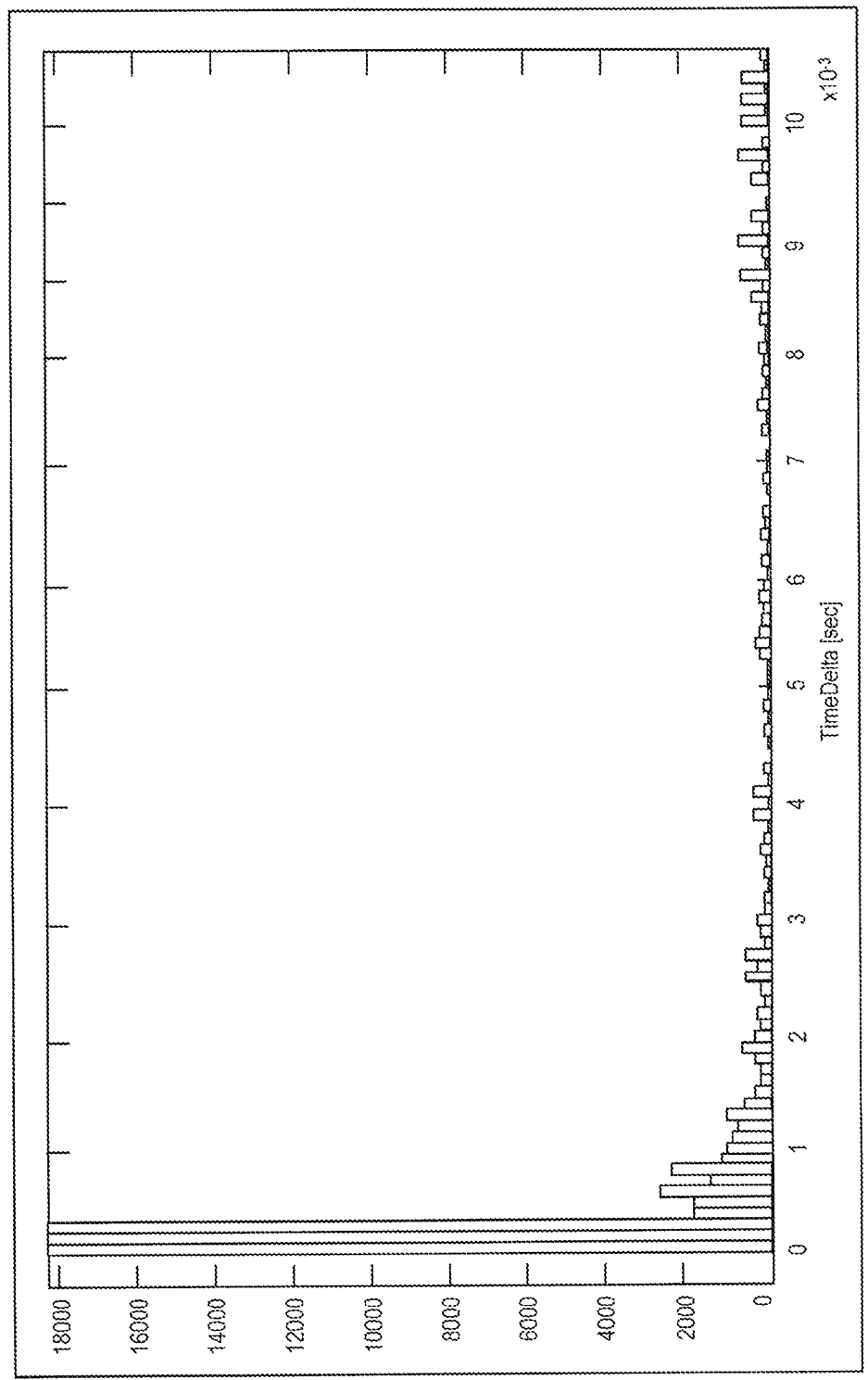
FIG. 14 is a histogram of a time delta between adjacent read commands of an embodiment.

FIGS. 13 and 14 are graphs of simulated results of the prediction capabilities of arrival times of future random read commands for benchmark traces using a memory of two million addresses. In FIG. 13, a successful prediction of the arrival time is defined if the difference between the actual duration and the predicted duration is less than (or equal to) 10 usec (=1e-5 sec). FIG. 14 is a histogram of the time-delta between adjacent read commands in a sample benchmark trace. It should be noted that, in this example, only 1.1% of the commands are with a TimeDelta of below 10 usec (excluding commands that can in the same time; 65.8% are with a TimeDelta of 0).

As noted above, the produced prediction of the time delta until when the next random read command will arrive may be used to improve system performance and reduce its complexity. For example, this can be used to "pre-fetch just in time." That is, the controller 102 can consider the inter-command delta time in history and pre-fetch the new predicted data just-in-time for when it is need (and not before). This supplemental information, which can come on top of the reference approach of predicting the coming LBA(s) and the expected commands length, can allow improving the storage management pipeline by allowing tuning of the system pipeline according to reliable estimations of the time until the next command comes.

There are several advantages associated with these embodiments, including, but not limited to, better resource (e.g., buffer/power) management, better quality of service (e.g., priority based on timing), reduction of the probability of overlapping (e.g., the host 300 sends the write command to an LBA that is in the storage system's cache), and better low-power management In another embodiment, a conditional HPM prediction update can be used. In this embodiment, the HPM mechanism can insert new commands to be updated in its log table (HPM-RAM) only in case that the time elapsed from the previous random read command does not exceed a predefined threshold. This threshold can indicate whether the new command is expected to belong to the same thread or probably belong to a new, unrelated thread. This embodiment can be useful in case the allocation for the log table (HPM-RAM) is small. By using this embodiment, the HPM module can avoid redundant "stepping over" of the information included in the RAM by unrelated information from other threads.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a volatile memory;
a non-volatile memory, and
a controller configured to:
predict a plurality of next read commands to be received from a host by selecting the plurality of next read commands from a plurality of sets of predicted next read commands based on prediction hit rate scores associated with the plurality of sets;
predict a time when the predicted plurality of next read commands will be received from the host;
at, but not before, the predicted time, read a plurality of data associated with the predicted plurality of next read commands from the non-volatile memory and cache the plurality of data in the volatile memory;
receive a next read command from the host;
compare the next read command received from the host with the predicted plurality of next read commands;
in response to the next read command received from the host matching one of the predicted plurality of next read commands, send cached data associated with the matched predicted next read command to the host;
in response to the next read command received from the host not matching any of the predicted plurality of next read commands, maintain the cached plurality of data in the volatile memory;
determine a prediction hit rate score for each of the cached plurality of data; and
evict cached data with a lowest prediction hit rate score from the volatile memory.

2. The storage system of claim 1, wherein the prediction hit rate score comprises a combination of a prediction hit rate and an age of a predicted command.

3. The storage system of claim 1, wherein the controller comprises a history pattern matcher (HPM) sub-system.

4. The storage system of claim 3, wherein the history pattern matcher (HPM) sub-system comprises a history pattern matcher (HPM), the volatile memory, and a cache manager.

5. The storage system of claim 1, wherein the controller is further configured to predict the plurality of next read commands using a history of prior read commands received from the host.

6. The storage system of claim 1, wherein the predicted plurality of next read commands comprises start logical block addresses and lengths.

7. The storage system of claim 1, wherein the non-volatile memory comprises a three-dimensional memory.

8. In a storage system comprising a non-volatile memory and a volatile memory, a method comprising:
generating a plurality of sets of predicted next read commands from a host, wherein each set is based on a different number of prior read commands actually received from the host;
generating a prediction hit rate score for each sets;
predicting a plurality of next read commands to be received from the host by selecting the plurality of next read command from the plurality of sets based on the generated prediction hit rate scores;
predicting a time when the predicted plurality of next read commands will be received from the host;
at, but not before, the predicted time, pre-fetching data from the non-volatile memory for the predicted plurality of next read commands and storing the pre-fetched data in the volatile memory; and
maintaining the pre-fetched data in the volatile memory even if a next read command received from the host does not match one of the predicted plurality of predicted next read commands, wherein the pre-fetched data is later evicted from the volatile memory in response to the pre-fetched data having a lowest prediction hit rate score among prediction hit rate scores of other pre-fetched data stored in the volatile memory.

9. The storage system of claim 1, wherein the controller is further configured to use the plurality of predicted next read commands for calibration.

10. The storage system of claim 1, wherein the controller is further configured to use the plurality of predicted next read commands for training.

11. The method of claim 8, wherein the plurality of sets are generated in parallel.

12. The method of claim 8, wherein the plurality of sets are generated using one or more history pattern matcher engines.

13. The method of claim 8, wherein the plurality of sets are generated by identifying logical block address (LBA) patterns in the prior read commands actually received from the host.

14. The method of claim 8, further comprising using the predicted plurality of next read commands for calibration.

15. The method of claim 8, further comprising using the predicted plurality of next read commands for training.

16. A storage system comprising:
a non-volatile memory;
a volatile memory;
means for predicting a plurality of next read commands to be received from a host by selecting the plurality of next read commands from a plurality of sets of predicted next read commands based on prediction hit rate scores associated with the plurality of sets;
means for predicting an arrival time for the predicted plurality of next read commands;
means for pre-fetching at, but not before, the predicted arrival time, a plurality of data associated with the predicted plurality of next read commands from the non-volatile memory and caching the plurality of data in the volatile memory;
means for receiving a next read command from the host;

means for comparing the next read command received from the host with the predicted plurality of next read commands;

means for sending cached data associated with the matched predicted next read command to the host in response to the next read command received from the host matching one of the predicted plurality of next read commands;

means for maintaining the cached plurality of data in the volatile memory in response to the next read command received from the host not matching any of the predicted plurality of next read commands means for determining a prediction hit rate score for each of the cached plurality of data; and means for evicting cached data with a lowest prediction hit rate score from the volatile memory.

17. The storage system of claim 16, further comprising means for predicting logical block addresses and lengths of the predicted plurality of next ead commands.

18. The storage system of claim 16, wherein the means for predicting the plurality of next read commands comprises a history pattern matcher engine.

19. The storage system of claim 16, further comprising means for updating a log only in response to the predicted arrival time being less than a threshold.

20. The storage system of claim 19, wherein the threshold indicates whether one of the plurality of predicted next read commands is in a same thread or a different thread than a previous command actually received from the host.

* * * * *